(12) United States Patent  
Tennevall

(10) Patent No.: US 11,236,638 B2  
(45) Date of Patent: Feb. 1, 2022

(54) TURBOCHARGER FLANGE

(71) Applicant: VOLVO TRUCK CORPORATION, Gothenburg (SE)

(72) Inventor: Peter Tennevall, Malmö (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/919,543

(22) Filed: Jul. 2, 2020

(65) Prior Publication Data

US 2020/0332679 A1 Oct. 22, 2020

Related U.S. Application Data

(63) Continuation of application No. 15/526,413, filed as application No. PCT/EP2014/025016 on Nov. 14, 2014, now abandoned.

(51) Int. Cl.

| F01D 25/24 | (2006.01) |
|---|---|
| F02B 37/00 | (2006.01) |
| F01N 13/18 | (2010.01) |
| F01N 13/10 | (2010.01) |
| F02B 67/10 | (2006.01) |
| F16L 23/032 | (2006.01) |
| F02B 39/00 | (2006.01) |

(52) U.S. Cl.  
CPC .......... *F01D 25/243* (2013.01); *F01N 13/10* (2013.01); *F01N 13/1805* (2013.01); *F01N 13/1855* (2013.01); *F02B 37/00* (2013.01); *F02B 67/10* (2013.01); *F16L 23/032* (2013.01); *F01N 2340/06* (2013.01); *F02B 39/00* (2013.01); *Y02T 10/12* (2013.01)

(58) Field of Classification Search  
CPC .. F01N 13/10; F01N 13/1805; F01N 13/1844; F01D 25/243  
See application file for complete search history.

(56) References Cited

U.S. PATENT DOCUMENTS

| 942,047 A | 12/1909 | Atkinson |
|---|---|---|
| 959,854 A | 5/1910 | Grierson |
| 5,918,912 A | 7/1999 | Keifel et al. |
| 5,934,070 A | 8/1999 | Lagelstorfer |
| 2011/0277466 A1 | 11/2011 | Danielewicz et al. |

(Continued)

FOREIGN PATENT DOCUMENTS

| CN | 201661066 U | 12/2010 |
|---|---|---|
| CN | 102235085 A | 11/2011 |

(Continued)

OTHER PUBLICATIONS

Machine generated English translation of description of DE19548175A1.*

(Continued)

*Primary Examiner* — Ngoc T Nguyen  
(74) *Attorney, Agent, or Firm* — Venable LLP; Jeffri A. Kaminski

(57) ABSTRACT

The invention relates to a turbocharger flange (200). The flange (200) comprises a mounting face (210) for attaching a turbocharger (100) to a manifold (40), wherein the mounting face (210) comprises a guiding structure (220) for guiding the flange (200) to an operative position in relation to said manifold (40).

28 Claims, 8 Drawing Sheets

(56) References Cited

U.S. PATENT DOCUMENTS

2014/0319830 A1    10/2014    Weidner et al.
2016/0326939 A1    11/2016    Persson

FOREIGN PATENT DOCUMENTS

| DE | 19548175 A1 | * | 6/1997 | ......... F01N 13/1805 |
|----|----|----|----|----|
| DE | 102008049093 A1 | | 4/2010 | |
| DE | 102008051128 A1 | | 4/2010 | |
| FR | 2902457 A3 | | 12/2001 | |
| FR | 2897893 A1 | | 8/2007 | |
| FR | 2921696 A1 | | 4/2009 | |
| GB | 2503212 A | | 12/2013 | |
| JP | S60123487 U | | 8/1985 | |
| JP | 2009222117 | | 1/2009 | |
| WO | 8600971 A1 | | 2/1986 | |

OTHER PUBLICATIONS

FR 2921696, Dumas, Pub Apr. 2009, English Translation (Year: 2009).
JP 2008-274904, Inoue, Pub Nov. 2008, English Translation (Year: 2008).
Japanese Official Action (dated Sep. 19, 2018) for corresponding Japanese App. 2017-525913.
China Office Action dated Feb. 1, 2019 in corresponding China Patent Application No. 201480083318.9, 17 pages.
International Search Report and Written Opinion dated May 5, 2015 in corresponding International PCT Application No. PCT/EP2014/025016, 8 pages.

* cited by examiner

TURBOCHARGER FLANGE

CROSS-REFERENCE TO RELATED APPLICATIONS

This application is a continuation of U.S. patent application Ser. No. 15/526,413, filed May 12, 2017 and U.S. National Stage application of PCT/EP2014/025016, filed Nov. 14, 2014 and published on May 19, 2016 as WO 2016/074692 A1, all of which is hereby incorporated by reference in its entirety.

TECHNICAL FIELD

The invention relates to a turbocharger flange for attaching a turbocharger to a manifold. The invention also relates to a corresponding manifold flange, and to a turbocharger having such turbocharger flange.

The invention can be applied in heavy-duty vehicles, such as trucks, buses and construction equipment. Although the invention will be described with respect to a truck, the invention is not restricted to this particular vehicle, but may also be used in other applications utilizing turbocharger units such as aero or marine systems.

BACKGROUND

A turbocharger is a vehicle component used together with an associated internal combustion engine, typically a diesel engine. The turbocharger is configured to recover a part of the energy of the exhaust gas and to use that energy to compress intake air flowing into the combustion chamber of the internal combustion engine. Turbochargers are commonly provided for increasing the efficiency and power of the internal combustion engine.

A turbocharger has three main components; a turbine for converting energy of the exhaust gas flow to a rotational movement of the turbine, a compressor rotationally connected to the turbine for compressing intake air, and a housing enclosing the turbine and the compressor as well as a rotating shaft, bearings, etc.

During operation the turbocharger is mounted to the cylinder head by connecting an exhaust gas inlet of the turbine side with a manifold of the internal combustion engine. One such example is shown in FR2921696, wherein the turbocharger flange is clamped against the manifold by means of an intermediate spacer arranged on the opposite side of the turbocharger flange. Bolts are inserted through the manifold and engage with threaded bores of the intermediate spacer, whereby the turbocharger flange is pressed against the manifold upon tightening of the bolts.

The above solution requires three bolts for ensuring sufficient attachment. Since the space available during mounting and dismounting of the turbocharger is highly limited, the above-described solution is undesirable. It would thus be advantageous to provide an improved turbocharger flange that allows for facilitated mounting and dismounting of the turbocharger from the manifold.

SUMMARY

An object of the invention is to provide a turbocharger flange overcoming the above mentioned drawbacks of prior art units.

According to a first aspect the object is achieved by a turbocharger flange according to claim 1. According to a second aspect the object is achieved by a manifold flange according to claim 26. According to a third aspect the object is achieved by a connection system according to claim 34. According to a fourth aspect the object is achieved by a turbocharger turbine housing according to claim 35. According to a fifth aspect the object is achieved by a turbocharger according to claim 36. According to a sixth aspect the object is achieved by a vehicle according to claim 38. According to a seventh aspect the object is achieved by a method according to claim 39.

By providing the mounting face, i.e. the surface facing the mating flange, with a guiding structure that guides the flange into an operative position, mounting of the flange is greatly facilitated. This is due to the fact that the no additional components are required in order to guide the flange into the operative position. Further, the guiding structure will also retain the flange in the operative position in a self-supported manner whereby final fixation may be performed easily.

A turbocharger flange is therefore provided. The turbocharger flange comprises a mounting face for attaching a turbocharger to a manifold, wherein the mounting face comprises a guiding structure for guiding the flange to an operative position in relation to said manifold.

In an embodiment, and the mounting face comprises a mounting structure for attaching said flange to the manifold. The mounting structure extends in a direction perpendicular to a mounting direction being defined by said guiding structure.

In an embodiment the mounting face surrounds a piping of said flange, and a normal of said mounting face is parallel to the axial direction of said piping. The axial direction thus corresponds to the flow direction through the piping. An even pressure on both sides of the piping is thus achieved upon mounting.

In an embodiment the mounting structure comprises a projection extending from the outer periphery of said mounting face in a direction being parallel to a normal of said mounting face. The projection may thus be available for a through hole, forming a bore for receiving a bolt.

The at least one bore may extend in said mounting direction, such that tightening of the turbocharger flange is performed by forcing the turbocharger flange in a radial direction.

At least one of said bores may be provided with internal threads for facilitating dismounting. Hence, if a bolt is screwed into the bore the turbocharger flange will be urged away from the manifold in the radial direction.

The guiding structure may have a tapering shape in the mounting direction. The tapering shape will assist in aligning the turbocharger flange during mounting.

In an embodiment the guiding structure comprises a step, and preferably the step forms an undercut. The undercut will form an axial guiding structure for facilitating mounting. In cooperation with the tapering shape of the guiding structure, axial compression is also provided.

In an embodiment the guiding structure extends along at least half a height of the mounting face in the mounting direction and preferably along the complete height of the mounting face in the mounting direction. The guiding surface will thus form a support surface for a corresponding manifold flange.

The guiding structure may comprise a central portion and two lateral portions arranged on two opposite sides of the central portion, wherein the central portion is displaced relative the lateral portions in a direction perpendicular to the mounting direction. A tapered step may preferably be provided by configuring the central portion to have a width formed by an extension in a direction towards the two lateral portions, and a height formed by an extension in the mounting direction, and wherein the width of the central portion decreases along its height. The central portion may form a projection in relation to the lateral portions, i.e. a step in a plane defining the width and the height. The step may have a conical shape.

In an embodiment the central portion has a depth formed by an extension in the direction of which the mounting structure extends, wherein the width of the central portion increases along its depth. This allows for the turbocharger to be mounted from above, wherein the dimensions of the central portion defines the end position, i.e. the lowermost position of the turbocharger flange relative the manifold flange.

A projection of the central portion, in a plane defining the width and the depth, may have a conical shape forming an undercut.

In an embodiment, a surface of each of the two lateral portions is substantially flat, and the surfaces of the two lateral portions may extend in parallel with each other. Preferably, the surfaces of the two lateral portions extend in the same plane.

In a further embodiment, an engagement surface of the central portion is substantially flat. Preferably, the engagement surface of the central portion extend substantially in parallel with the engagement surfaces of the two lateral portions.

In an embodiment, the flange is configured for a substantially vertical mounting movement of the turbocharger relative to the manifold.

A manifold flange is also provided, comprising a support face for attaching a turbocharger flange to a manifold. The support face comprises an engagement structure for allowing a guiding structure of a turbocharger flange to be guided into an operative position in relation to said manifold flange.

In an embodiment, the manifold flange further comprises attachment means for allowing a mounting structure of the turbocharger flange to be securely attached to the manifold flange, wherein the attachment means extends in a direction parallel to a mounting direction being defined by said engagement structure.

The attachment means may comprise at least one threaded bore whereby the turbocharger flange may be secured to the manifold flange by screwing a bolt into the threaded bore.

In an embodiment the engagement structure comprises a central portion and two lateral portions arranged on two opposite sides of the central portion, wherein the central portion is displaced relative the lateral portions in a direction perpendicular to the mounting direction.

The central portion may have a width formed by an extension in a direction towards the two lateral portions, and a height formed by an extension in the mounting direction, wherein the width of the central portion increases along its height. Further to this, a projection of the central portion, in a plane defining the width and the height, may have a conical shape. In preferred embodiments the central portion has a depth, and the width of the central portion decreases along its depth. A projection of the central portion, in a plane defining the width and the depth, may have a conical shape.

A connection system for attaching a turbocharger to a manifold is also provided. The connection system comprises a turbocharger flange, and a manifold flange in accordance with the descriptions above.

A turbocharger turbine housing is also provided, comprising a turbocharger flange in accordance with the description above. The flange forms a one-piece unit with the turbocharger turbine housing.

A turbocharger is also provided comprising an exhaust gas inlet and a turbocharger flange according to the description above.

In an embodiment, the flange forms a one-piece unit with a turbocharger turbine housing.

A vehicle is also provided, comprising a turbocharger according to the description above.

A method for attaching a turbocharger to a vehicle component, such as a manifold, is also provided. The method comprises the steps of positioning a turbocharger so that a connection flange thereof is displaced in relation to a corresponding connection flange of the vehicle component in a predefined mounting direction, and moving the turbocharger in relation to the vehicle component in the mounting direction while a guiding structure of the turbocharger flange guides the flange towards an operative position in relation to said manifold.

In an embodiment, the method further comprises the step of moving the turbocharger in relation to the vehicle component in the mounting direction, which is in a transverse direction in relation to a normal of the mounting face of the turbocharger flange.

The method may further comprise the step of moving the turbocharger in relation to the vehicle component in the mounting direction, which is in a direction perpendicular to a normal of the mounting face of the turbocharger flange.

In an embodiment, the method further comprises the step of attaching said turbocharger flange to the manifold flange after the mounting movement towards the operative position.

The method may further comprise the step of attaching said turbocharger flange to the manifold flange by tightening an engagement between said turbocharger flange and the manifold flange so that the turbocharger is forced to its operative position.

In an embodiment the method further comprises the step of moving the turbocharger relative to the manifold substantially in a substantially vertical direction from above in the mounting movement.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
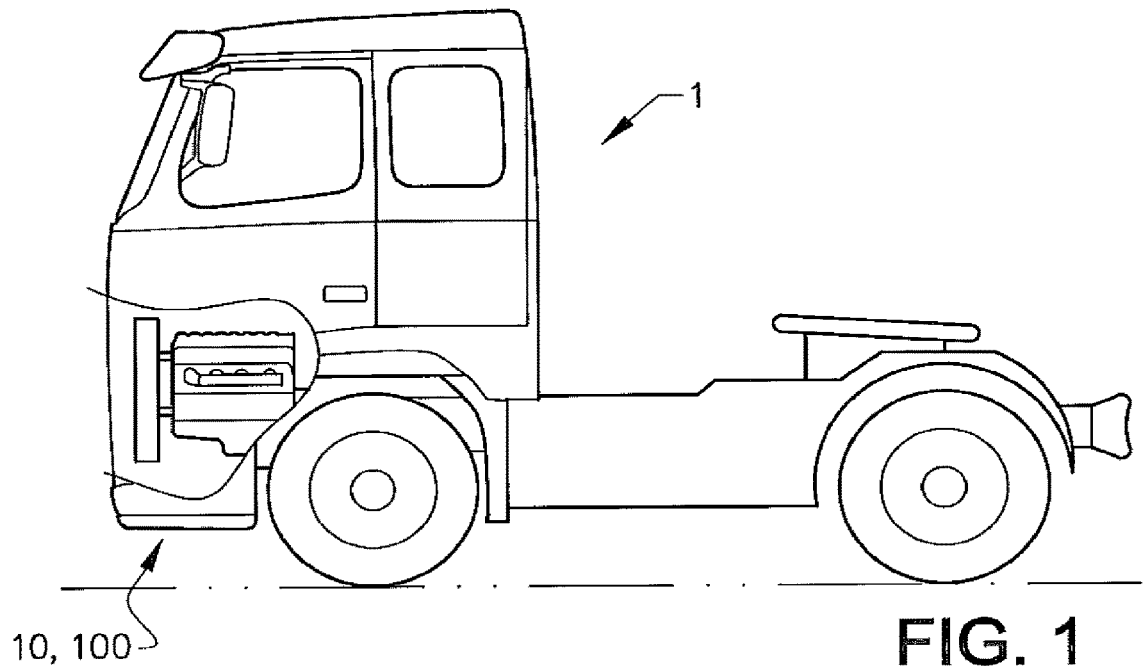
FIG. 1 is a side view of a vehicle according to an embodiment.

Starting with FIG. 1 a vehicle 1 is shown. The vehicle 1, which is illustrated as a truck, has an internal combustion engine 10 for driving the vehicle 1. As will be further explained below the internal combustion engine 10 of the vehicle 1 is provided with a turbocharger 100 according to various embodiments. The vehicle 1 may have additional propulsion units, such as electric drives etc. as long as it has at least one engine providing a flow of exhaust gases interacting with the turbocharger 100. Hence the vehicle 1 is not exclusively a truck but may also represent various vehicles such as buses, constructional equipment, etc.

Figure 2:
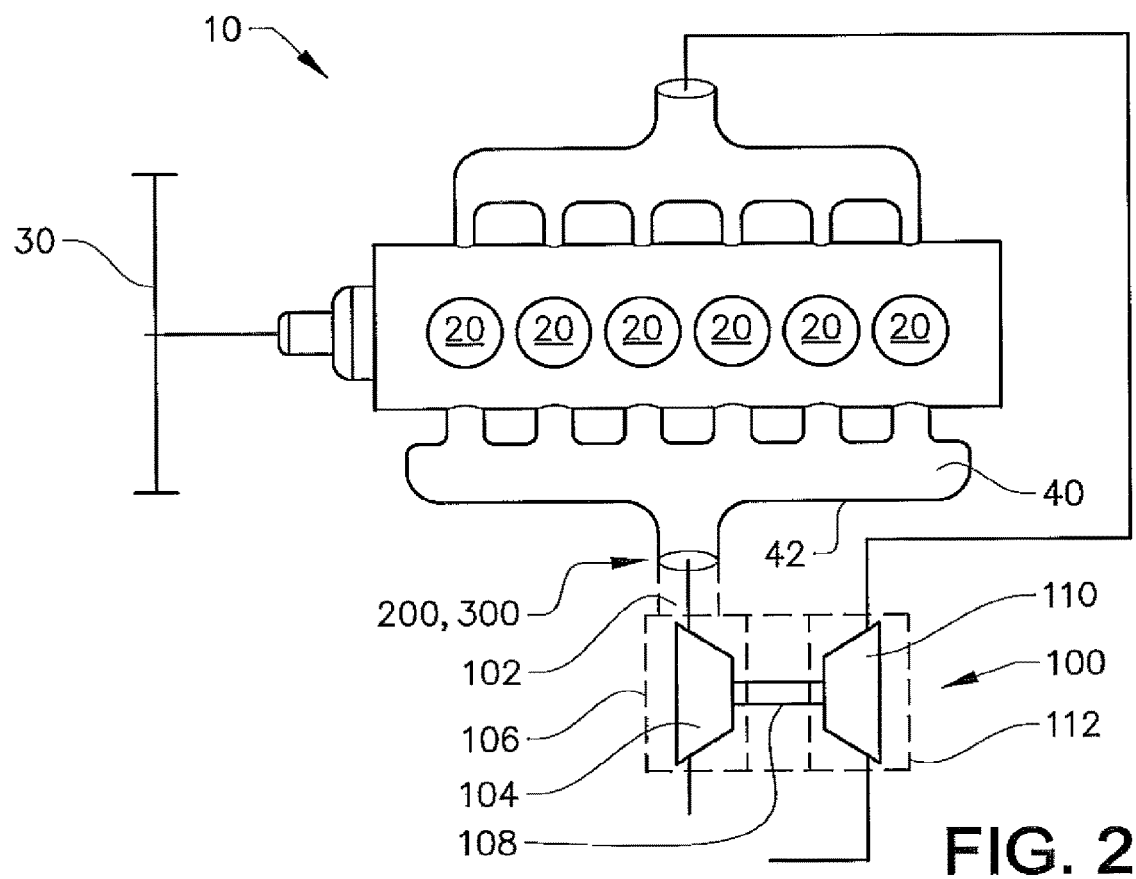
FIG. 2 is a schematic view of an internal combustion engine according to an embodiment.

In FIG. 2 an example of an internal combustion engine 10 is shown. The internal combustion engine 10 includes a plurality of cylinders 20 operated to combust fuel, such as diesel or gasoline, whereby the motion of pistons reciprocating in the cylinders 20 is transmitted to a rotation movement of a crank shaft 30. The crank shaft 30 is further coupled to a transmission (not shown) for providing a torque to driving elements (not shown). In case of a heavy vehicle, such as a truck, the driving elements are wheels; however the internal combustion engine 10 may also be used for other equipment such as construction equipment, marine applications, etc.

The internal combustion engine 10 further comprises an exhaust gas system 40, which system 40 serves the purpose of recovering at least some of the energy in the exhaust gas flow to improve the performance of the internal combustion engine 10. In the shown example the exhaust gas exits the cylinders 20 and enters an exhaust manifold 42 which is further connected to an exhaust inlet 102 of a turbocharger 100. The exhaust gas flow causes a turbine 104 arranged inside a turbine housing 106 to rotate, which rotation is translated via a shaft 108 to a corresponding rotation of a compressor 110 arranged inside a compressor housing 112 and being used to compress incoming air before it is introduced in the cylinders 20. The basic structural as well as functional specifications of a turbocharger 100 are well known in the art and will not be described in full details.

The turbocharger 100 comprises a turbocharger flange 200 which is attached to the manifold 42, forming part of an engine structure, via an associated manifold flange 300. The turbocharger flange 200 is formed as one piece, and it may be integrally formed with the turbine housing 106.

Figure 3:
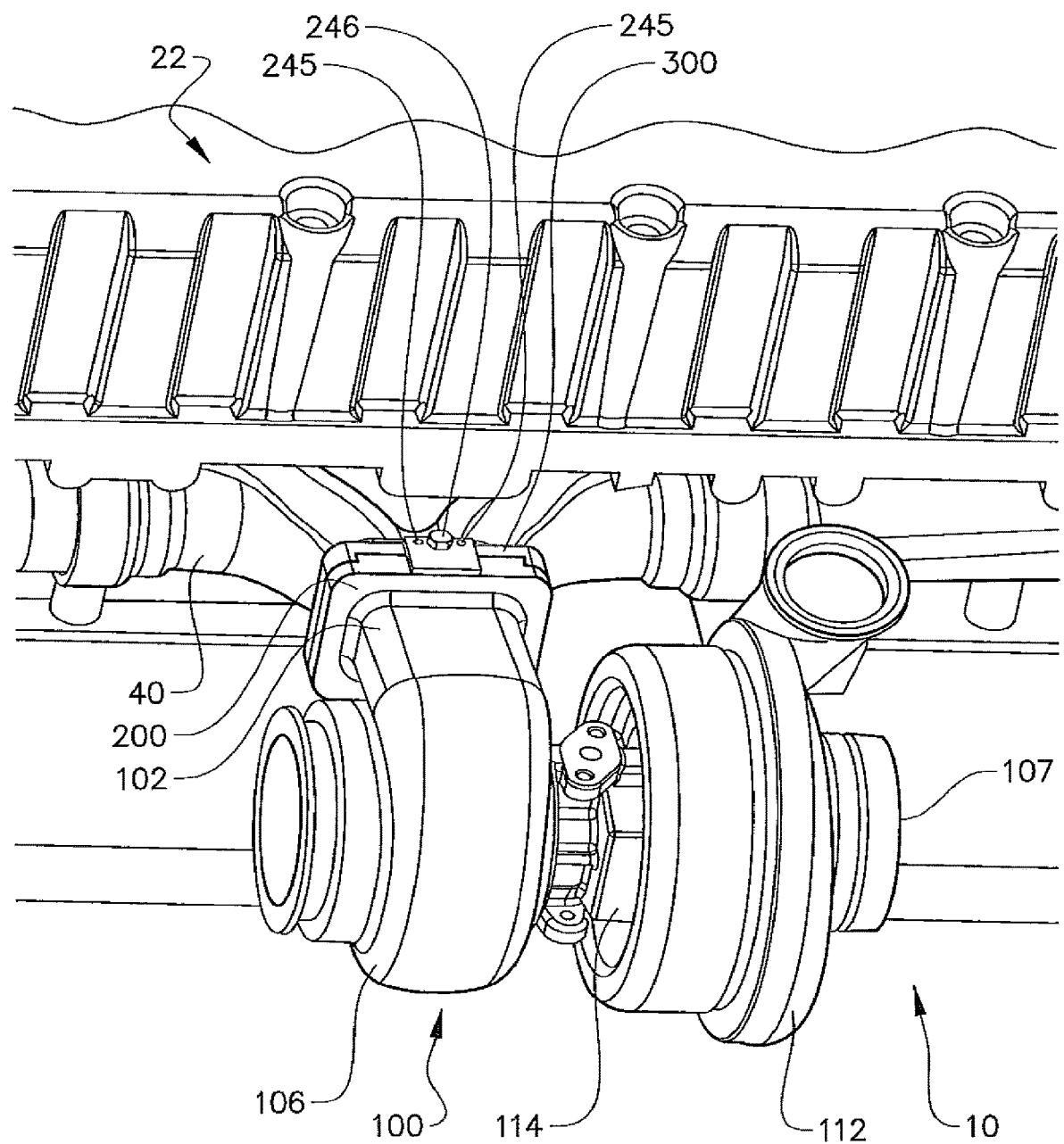
FIG. 3 is an isometric view of a turbocharger being attached to a cylinder block via a turbocharger flange according to an embodiment.
Figure 4:
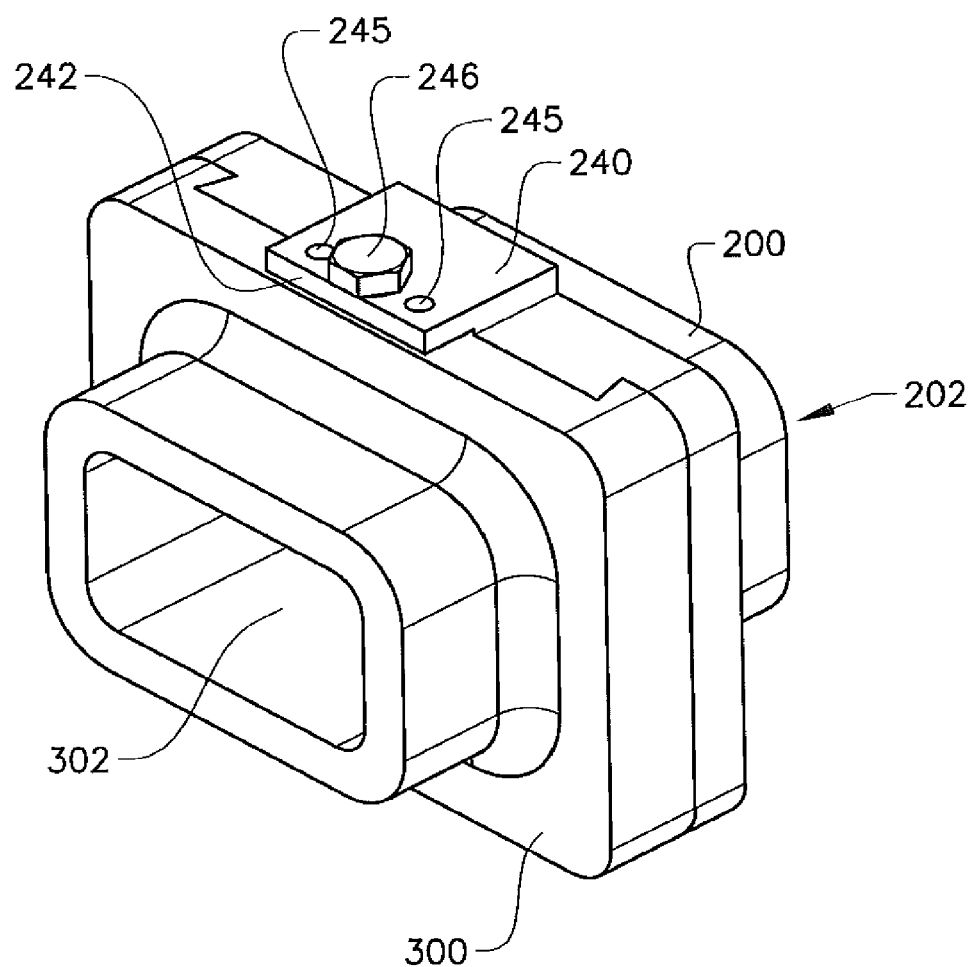
FIG. 4 is an isometric view of a turbocharger flange in cooperation with a manifold flange according to an embodiment.

Now turning to FIG. 3 an embodiment of a turbocharger 100 is shown. The turbocharger 100 is attached to an internal combustion engine 10 via the manifold 42. The turbocharger 100 comprises a turbine 104 arranged inside a turbine housing 106, a compressor 110 arranged inside a compressor housing 112, and a shaft 108 connecting the compressor 110 with the turbine 104 such that rotation of the turbine 104 causes a corresponding rotation of the compressor 110. A bearing housing 114 is provided between the turbine housing 106 and the compressor housing 112. The turbocharger 100 further comprises an exhaust inlet 102 at the turbine housing 106 as well as an air inlet 107 at the compressor housing 112. The bearing housing 114 further forms a support for bearings, in order to allow the shaft 108 to rotate with a minimum of friction and vibration.

As can be seen in FIG. 3 the turbocharger 100 is connected to the manifold 42 by means of flanges 200, 300. A turbocharger flange 200 is provided at the exhaust inlet 102 of the turbocharger 100, i.e. being attached to the turbocharger turbine housing 106. In one embodiment, the turbocharger flange 200 is integrally formed with the turbocharger turbine housing 106. In an alternative embodiment, the turbocharger flange 200 is formed as a separate component, being securely attached to the turbine housing 106 e.g. by means of bolts or similar.

A manifold flange 300 is provided at the exhaust manifold 42. In one embodiment, the manifold flange 300 is integrally formed with the manifold 42. In an alternative embodiment, the manifold flange 300 is formed as a separate component, being securely attached to the manifold 42 e.g. by means of bolts or similar.

The flanges 200, 300 are attached to each other by means of one or more bolts 246, extending through a bore of the turbocharger flange 200 and cooperating with internal threads of a corresponding bore of the manifold flange 300.

The flanges 200, 300 engage with each other in a vertical plane. Hence, the turbocharger 100 may during mounting be guided from vertically above the manifold 42, and preattached to the manifold when it slide into the correct vertical position. Final attachment is achieved by tightening the bolt 246, whereby a vertical, i.e. radial fixation is provided as well as an axial, i.e. horizontal fixation.

The flanges 200, 300 are shown in FIGS. 4-10. Starting in FIGS. 4-6, each flange 200, 300 surrounds a piping 202, 302 for guiding exhaust gases from the manifold 42 to the turbocharger 100. The piping 202, 302 is shown to have a rectangular cross-section, however other shapes are also possible. The turbocharger flange 200 has a mounting face 210 facing the manifold flange 300 and having a guiding structure 220 for guiding the flange 200 to an operative position in relation to said manifold 42. The guiding structure 220 is integrally formed with the flange 200. Further to this, the turbocharger flange 100 has a mounting structure 240 for attaching the flange 200 to the manifold 42, wherein the mounting structure 240 extends in a direction perpendicular to a mounting direction being defined by said guiding structure 220.

Figure 5:
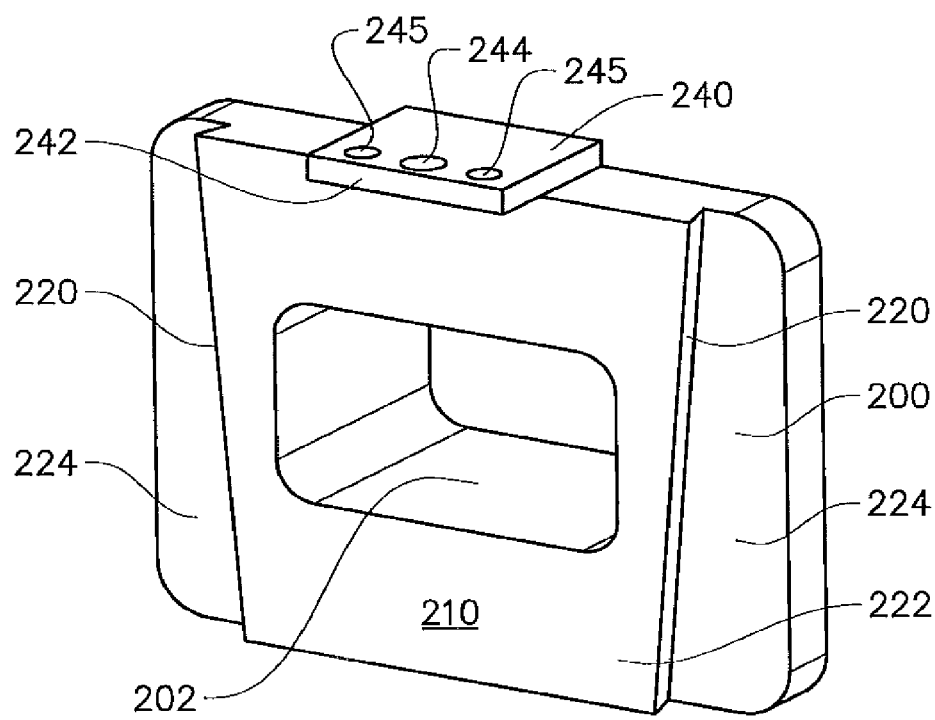
FIG. 5 is an isometric view of the turbocharger flange shown in FIG. 4.

As shown in FIG. 5, a normal of the mounting face 210 is parallel to the axial direction of the piping 202. A projection 242 is further extending from the outer periphery of the mounting face 210 in a direction being parallel to a normal of the mounting face 210. The projection 242 comprises one or more bores 244, 245, each of which being configured to receive a bolt 246. The bores 244, 245 extend in a radial direction, i.e. in the mounting direction. At least one of the bores 245 is provided with internal threads, thus forming a jacking hole for allowing removal of the turbocharger 100 from the manifold 42.

The guiding structure 220 comprises a central portion 222 and two lateral portions 224 arranged on two opposite sides of the central portion 222. The central portion 222 is displaced relative the lateral portions 224 in a direction perpendicular to the mounting direction such that the guiding structure 220 comprises a step.

The central portion 222 has a width formed by an extension in a direction towards the two lateral portions 224, and a height formed by an extension in the mounting direction. The width of the central portion 222 decreases along its height such that the guiding structure 220 has a tapering shape in the mounting direction. As can be seen in FIG. 5, a projection of the central portion 222 has a tapering shape. The guiding structure 220 extends along the complete height of the mounting face in the mounting direction. However, the guiding structure 220 may have a less extension, such as half the height of the mounting face.

Further to this the central portion 222 has a depth formed by an extension in the direction of which the mounting structure 240 extends, i.e. in an axial direction towards the manifold flange 300, and the width of the central portion 222 increases along its depth. A projection of the central portion 222 has preferably a tapering shape. Hence, the step formed by the central portion projection forms an undercut.

Figure 6:
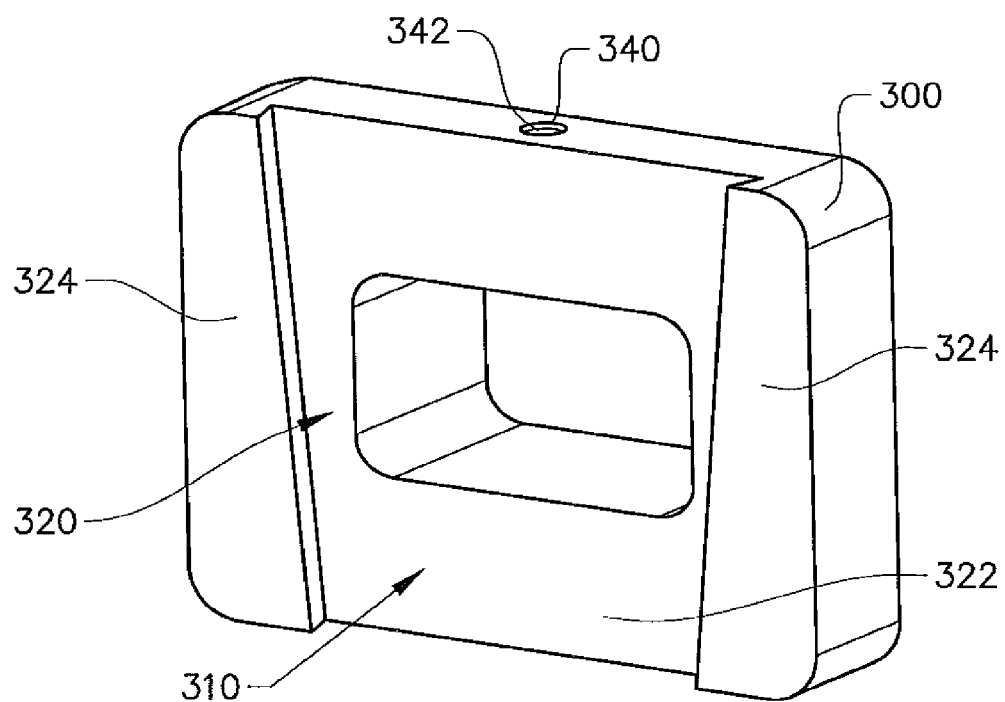
FIG. 6 is an isometric view of the manifold flange shown in FIG. 4, FIGS. 7-8 are exploded isometric views of the turbocharger flange and the manifold flange shown in FIG. 4.

The manifold flange 300, shown in more detail in FIG. 6, has a structure for engagement with the turbocharger flange 200. The manifold flange 300 has a support face 310 for mating with the turbocharger flange 200. The support face 310 comprises an engagement structure 320 for allowing the guiding structure 220 of the turbocharger flange 200 to be guided into an operative position in relation to the manifold flange 300. Further, the manifold flange 300 has attachment means 340 for allowing the mounting structure 240 of the turbocharger flange 200 to be securely attached to the manifold flange 300. The attachment means 340 extends in a direction parallel to a mounting direction being defined by the engagement structure 320, i.e. in a radial direction.

The attachment means 340 comprises at least one threaded bore 342 such that a bolt may be screwed into the bore 342. In addition to this, the engagement structure 320 has a central portion 322 and two lateral portions 324 arranged on two opposite sides of the central portion 322. The central portion 322 is displaced away from the turbocharger flange 200 relative the lateral portions 324 in a direction perpendicular to the mounting direction, i.e. in the axial direction.

The central portion 322 has a width formed by an extension in a direction towards the two lateral portions 324, and a height formed by an extension in the mounting direction. The width of the central portion 322 increases along its height, such that the central portion 322 is tapered. The tapered shape may be conical. Further to this the central portion 322 may form an undercut profile, i.e. the central portion 322 has a depth, and the width of the central portion 322 decreases along its depth. The undercut may have a conical shape.

The turbocharger flange 200 and the manifold flange 300 forms a connection system, suitable for attaching a turbocharger 100 to a manifold 42.

Figure 7:
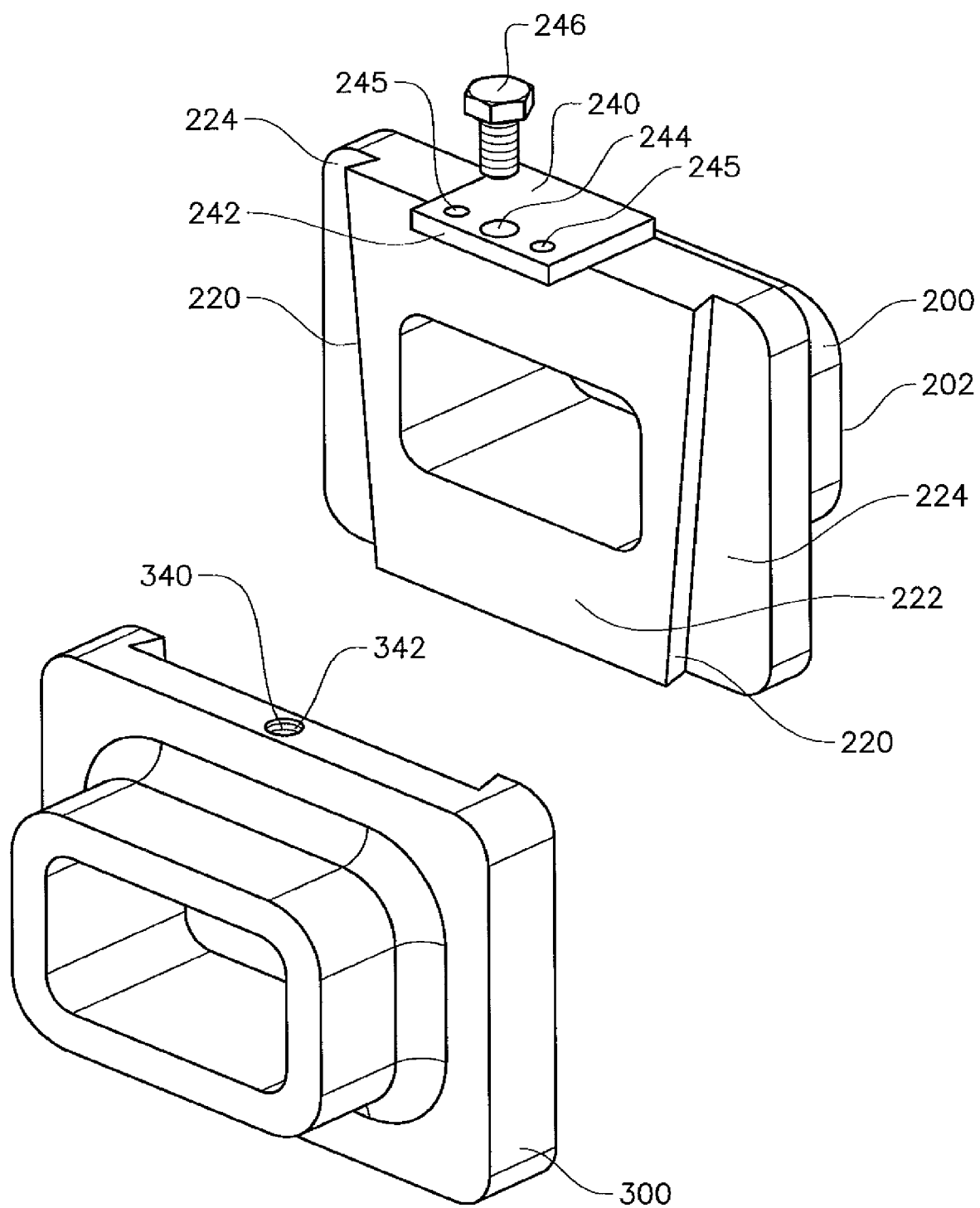
Figure 8:
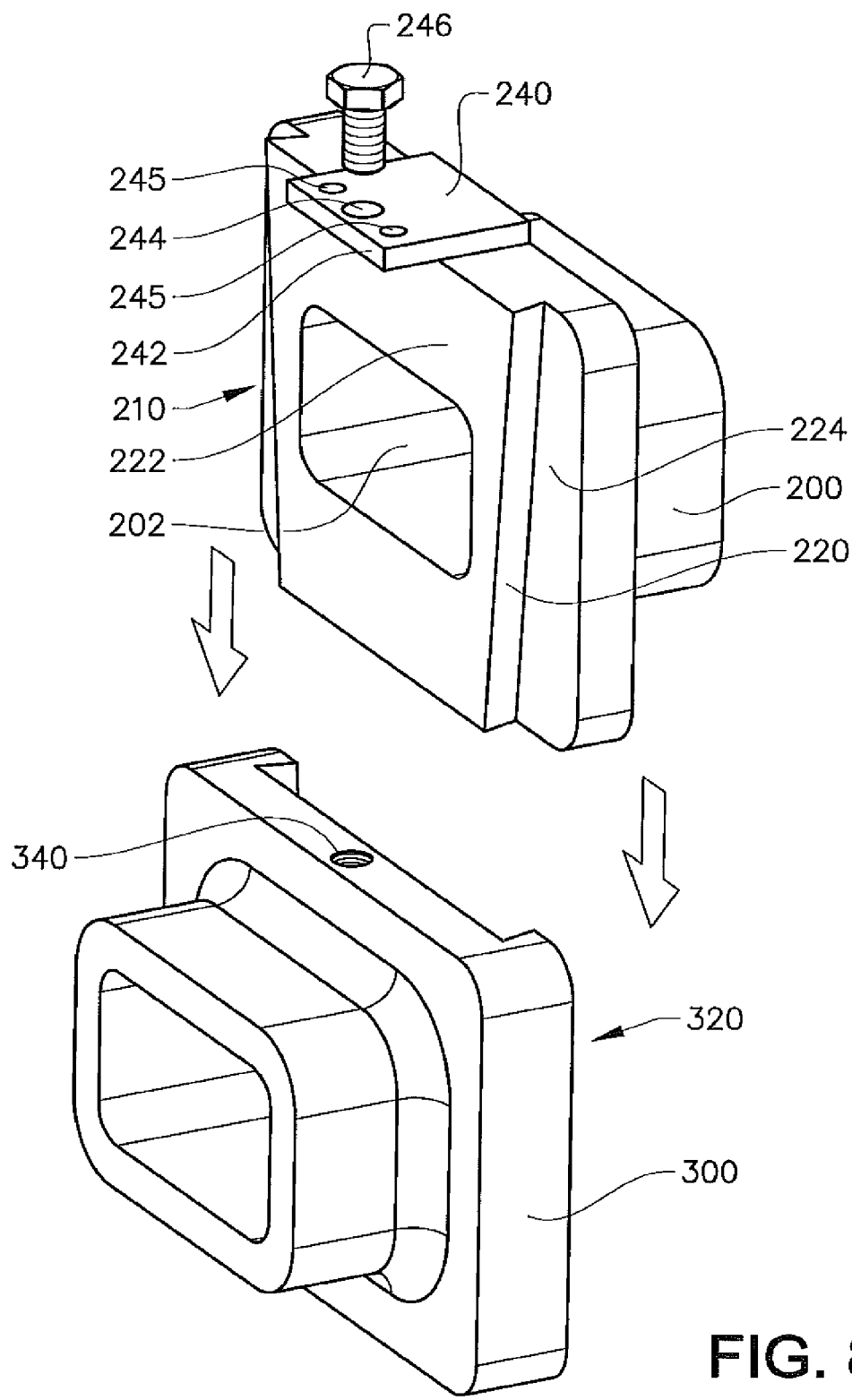

Now turning to FIGS. 7-10, mounting of the turbocharger 100 to the manifold will be described. In FIGS. 7-8 the flanges 200, 300 are shown. The manifold flange 200 is assumed to be connected to a manifold (not shown), while the turbocharger flange 200 is assumed to be securely attached to a turbine housing of a turbocharger (not shown). The turbocharger 100 is horizontally aligned with the manifold 42, such that the turbocharger flange 200 is arranged vertically above the manifold flange 300 as is shown in FIG. 8. When lowering the turbocharger 100 towards the manifold flange 300 the central portion 220 of the turbocharger flange 200 will be inserted into the groove formed by the central portion 320 of the manifold flange 300. Since the lower part of the central portion 220 is smaller than the upper part of the central portion 320, radial alignment will be fairly easy.

Upon further lowering of the turbocharger flange 200, the undercut profile of the central portions 220, 320 will prevent axial displacement of the turbocharger flange 200. Hence, a pre-mounting is achieved. Further to this the intrinsic weight of the turbocharger 100 will urge the flange 200 downwards, into further engagement with the manifold flange 300. The person actually mounting the turbocharger 100 will consequently allow the turbocharger 100 to rest by its own in order to prepare and perform secure attachment.

For this, a bolt 246 is inserted into the bore 244 of the turbocharger flange 200. As the bolt 246 is screwed, the threads of the bolt 246 will engage with the internal threads of the bore 342 of the manifold flange 300, thus urging the turbocharger flange 200 further downwards. The tapered profiles of the central portions 220, 320, both in radial and axial direction, will then provide secure attachment both in axial and radial directions.

Figure 9:
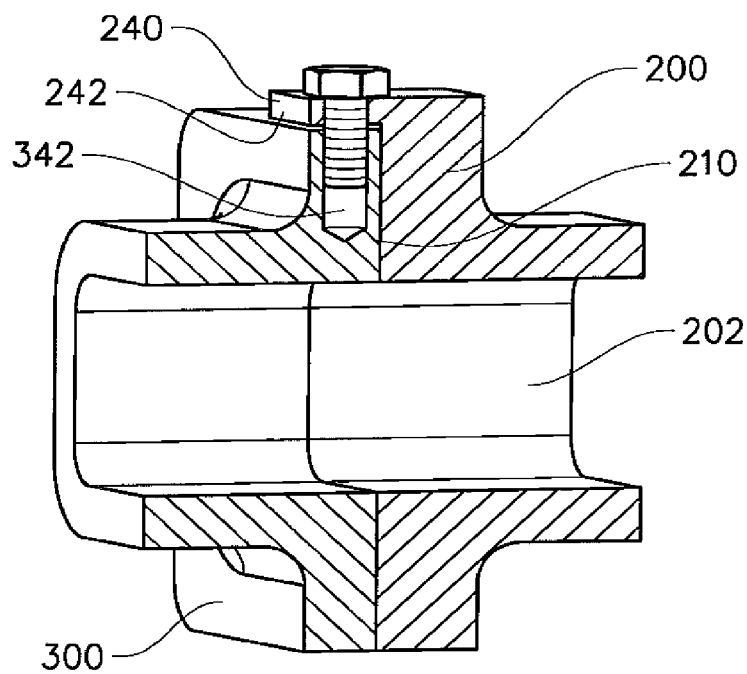
FIG. 9 is a cross-sectional isometric view of the turbocharger flange and the manifold flange shown in FIG. 4.
Figure 10:
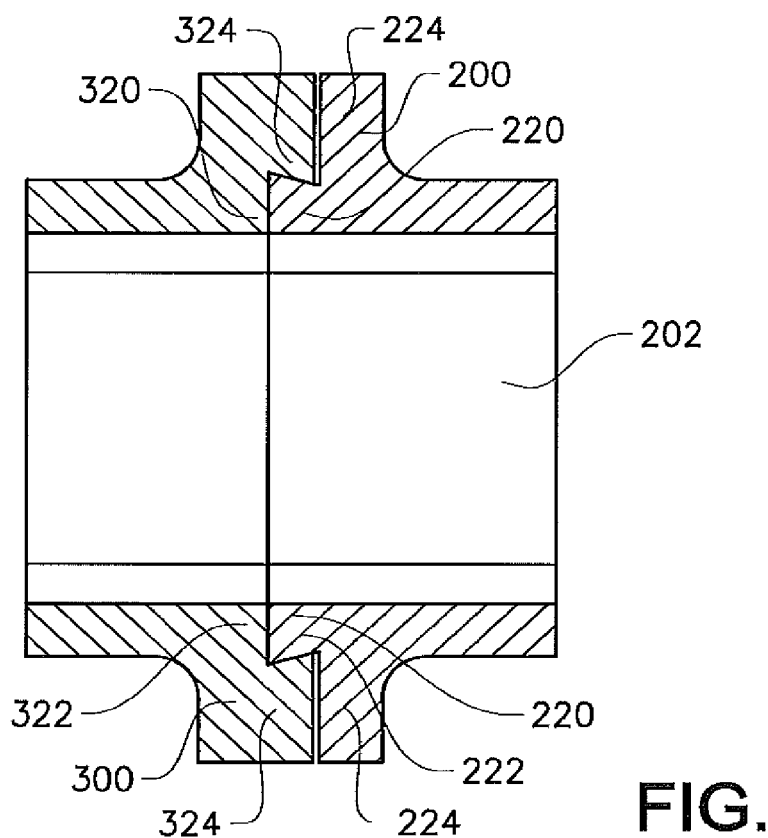
FIG. 10 is a cross-sectional view of the turbocharger flange and the manifold flange shown in FIG. 4.

In FIG. 9 the connection system is shown, where the bolt 246 has been used to urge the turbocharger flange 200 into full engagement with the manifold flange 300. The projection 240 will not form a stop for the radial positioning of the flange 200, but such radial end position is instead provided by the fact that the central portion 222 of the guiding structure 220 comes into contact with the central portion 322 of the engagement structure 320, preventing the turbocharger flange 200 to move further down.

The interaction between the central portions 220, 320 is shown in FIG. 9. A gap is preferably provided between the lateral portions 224, 324 such that full contact is ensured between the central portions 220, 320 in radial and axial direction.

When the turbocharger 100 is to be dismounted from the engine, bolts are inserted and screwed into the jacking holes 245 of the turbocharger flange 200. As they protrude downwards, they will urge the turbocharger flange 200 upwards as long as the bolt 246 is unscrewed. When the turbocharger flange 200 reaches a specific height, manual lifting will remove the turbocharger 200 from the manifold 42.

Figure 11:
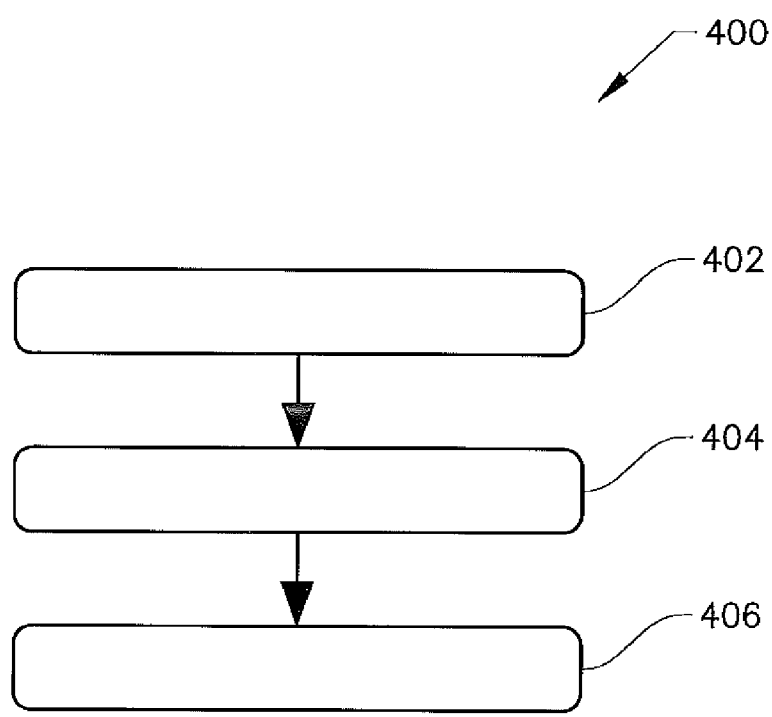
FIG. 11 is a schematic view of a method according to an embodiment.

Now turning to FIG. 11 a method 400 for attaching a turbocharger to a vehicle component, such as a manifold, will be described. The method 400 comprises a first step 402 of providing an exhaust gas inlet of said turbocharger with a flange, and a second step 404 of guiding said flange into an engagement position relative said vehicle component by moving the turbocharger in a first direction, i.e. a vertical direction. The first direction is perpendicular to a normal of a mounting face of the flange. A step 406 is thereafter performed in which the flange is secured to the vehicle component by tightening the position of the turbocharger in said first direction, i.e. in the vertical direction.

In the description so far two mating flanges 200, 300 have been described. Although the flange 200 has been described as being attached to a turbocharger, while the flange 300 has been described as being attached to a manifold, the respective position of the flanges 200, 300 could be modified such that the flange 300 is in fact attached to the turbocharger, thus forming a turbocharger flange, while the flange 200 is attached to the manifold, thus forming a manifold flange.

It is to be understood that the present invention is not limited to the embodiments described above and illustrated in the drawings; rather, the skilled person will recognize that many changes and modifications may be made within the scope of the appended claims.

The invention claimed is:

1. A turbocharger flange comprising a mounting face for attaching a turbocharger to a manifold, the mounting face comprises a guiding structure for guiding the flange to an operative position in relation to the manifold, wherein the guiding structure is configured to retain the flange in the operative position in a self-supported manner, wherein the guiding structure comprises a step, wherein the mounting face comprises a mounting structure for attaching the flange to the manifold, wherein the mounting structure comprises a projection extending from an outer periphery of the mounting face, and
wherein the mounting structure extends in a direction perpendicular to a mounting direction being defined by the guiding structure, wherein the mounting direction is perpendicular to a normal of the mounting face.

2. The flange according to claim 1, wherein the mounting face surrounds a passage of the flange.

3. The flange according to claim 2, wherein the normal of the mounting face is parallel to the axial direction of the passage.

4. The flange according to claim 1, wherein the projection extends in a direction being parallel to the normal of the mounting face.

5. The flange according to claim 1, wherein the projection comprises at least one bore for receiving a bolt.

6. The flange according to claim 5, wherein the at least one bore extends in the mounting direction.

7. The flange according to claim 5, wherein the at least one bore of the is provided with internal threads.

8. The flange according to claim 1, wherein the guiding structure has a tapering shape in the mounting direction.

9. The flange according to claim 1, wherein the step forms an undercut.

10. The flange according to claim 1, wherein the guiding structure extends along at least half a height of the mounting face in the mounting direction.

11. The flange according to claim 10, wherein the guiding structure extends along the complete height of the mounting face in the mounting direction.

12. The flange according to claim 1, wherein the guiding structure comprises a central portion and two lateral portions arranged on two opposite sides of the central portion, wherein the central portion is displaced relative the lateral portions in a direction perpendicular to the mounting direction.

13. The flange according to claim 12, wherein the central portion has a width formed by an extension in a direction towards the two lateral portions, and a height formed by an extension in the mounting direction, and wherein the width of the central portion decreases along its height.

14. The flange according to claim 13, wherein the central portion forms a projection in relation to the lateral portions.

15. The flange according to claim 14, wherein the projecting central portion has a conical tapering shape in a plane defining the width and the height.

16. The flange according to claim 14, wherein the central portion has a depth formed by an extension in the direction of which the mounting structure extends, and wherein the width of the central portion increases along its depth, and wherein the projecting central portion has a tapering shape.

17. The flange according to claim 12, wherein the central portion has a depth formed by an extension in the direction of which the mounting structure extends, and wherein the width of the central portion increases along its depth.

18. The flange according to claim 12, wherein a surface of each of the two lateral portions is substantially flat.

19. The flange according to claim 18, wherein the surfaces of the two lateral portions extend in parallel with each other.

20. The flange according to claim 19, wherein the surfaces of the two lateral portions extend in the same plane.

21. The flange according to claim 12, wherein an engagement surface of the central portion is substantially flat.

22. The flange according to claim 21, wherein the engagement surface of the central portion extend substantially in parallel with the engagement surfaces of the two lateral portions.

23. The flange according to claim 1, wherein the flange is configured for movement of the turbocharger relative to the manifold in the mounting direction.

24. A connection system for attaching a turbocharger to a manifold, comprises a turbocharger flange according to claim 1.

25. A turbocharger turbine housing wherein it comprises a turbocharger flange according to claim 1, wherein the flange forms a one-piece unit with the turbocharger turbine housing.

26. The turbocharger recited in claim 1 comprising an exhaust gas inlet wherein it is provided with the flange.

27. The turbocharger according to claim 26, wherein the flange forms a one-piece unit with a turbocharger turbine housing.

28. A vehicle comprising the turbocharger according to claim 27.

* * * * *